(12) United States Patent
Kasamura et al.

(10) Patent No.: US 8,041,838 B2
(45) Date of Patent: Oct. 18, 2011

(54) CONTENT DISPLAY DEVICE AND CONTENT DISPLAY METHOD

(75) Inventors: Hiroyuki Kasamura, Kanagawa (JP); Masanori Inui, Tokyo (JP); Hirotsugu Nomura, Tokyo (JP)

(73) Assignee: Iwatsu Electric Co., Ltd., Tokyo (JP)

( * ) Notice: Subject to any disclaimer, the term of this patent is extended or adjusted under 35 U.S.C. 154(b) by 174 days.

(21) Appl. No.: 12/428,576

(22) Filed: Apr. 23, 2009

(65) Prior Publication Data

US 2010/0030847 A1    Feb. 4, 2010

(30) Foreign Application Priority Data

Jul. 29, 2008    (JP) .................................. 2008-194756

(51) Int. Cl.
*G06F 15/16* (2006.01)
(52) U.S. Cl. ........................................ 709/246; 709/203
(58) Field of Classification Search .................. 709/203, 709/246; 370/260
See application file for complete search history.

(56) References Cited

U.S. PATENT DOCUMENTS

| | | | | |
|---|---|---|---|---|
| 6,760,759 B1 * | 7/2004 | Chan | ................................ | 709/219 |
| 6,915,328 B2 * | 7/2005 | Turnbull | ........................ | 709/203 |
| 7,574,486 B1 * | 8/2009 | Cheng et al. | .................... | 709/219 |
| 2006/0031387 A1 * | 2/2006 | Hamzeh et al. | ................ | 709/217 |
| 2008/0028335 A1 * | 1/2008 | Rohrabaugh et al. | .......... | 715/800 |
| 2008/0081621 A1 * | 4/2008 | Li | ................................ | 455/435.1 |

FOREIGN PATENT DOCUMENTS

| | | |
|---|---|---|
| JP | 2000-134335 | 5/2000 |
| JP | 2003-070036 A | 3/2003 |
| JP | 2006-245757 | 9/2006 |

OTHER PUBLICATIONS

Office Action from corresponding Japanese application Serial No. 2008-194756, dated Oct. 15, 2010.

* cited by examiner

*Primary Examiner* — Andrew Caldwell
*Assistant Examiner* — Lin Liu
(74) *Attorney, Agent, or Firm* — Westman, Champlin & Kelly, P.A.

(57) ABSTRACT

The present invention is a content display device provided with: a main device including a plurality of telephone terminals under control; and a content delivery server for delivering a content to the main device. A content delivery server 30 includes a content converting unit for converting data received from the WEB server into text information. A main device 20 is provided with: a content-display control unit for editing the acquired content information; a transmission control unit for analyzing from which telephone terminal a content acquisition request is made and also for delivering the edited content information; and a storage unit for storing content request information including a location of the content delivery server and a parameter number necessary at the time of obtaining the content information. The telephone terminal includes a button unit for finalizing a plurality of tables of contents displayed on the display unit and parameters.

5 Claims, 10 Drawing Sheets

Fig. 2
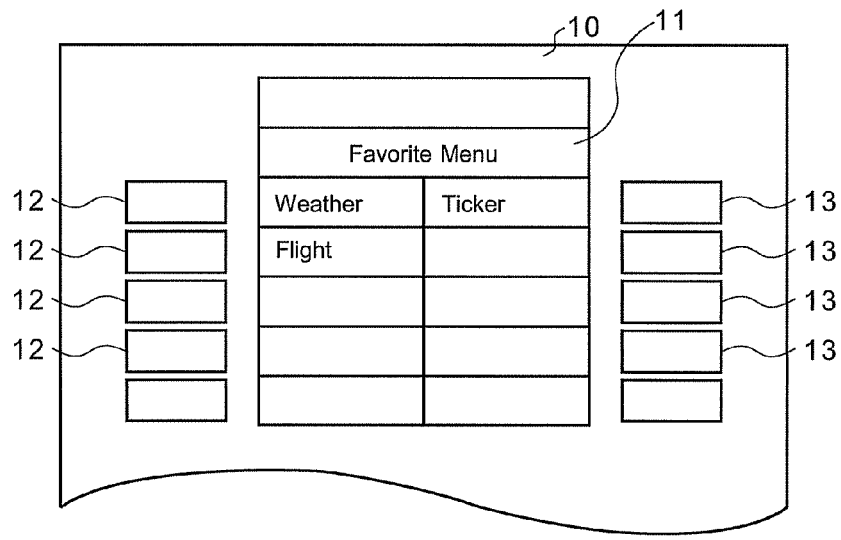
Fig. 3
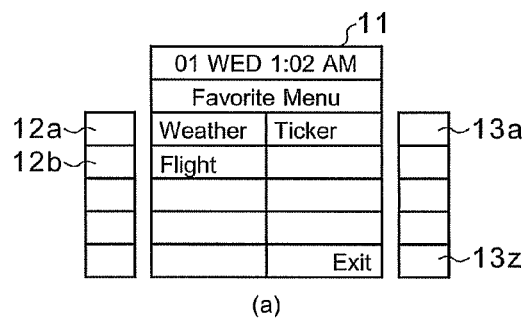
(a)
(1) SELECTION EXAMPLE 1
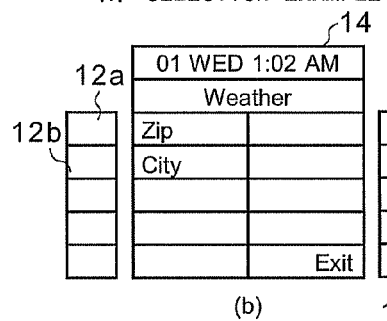
(b)
(2) SELECTION EXAMPLE 2
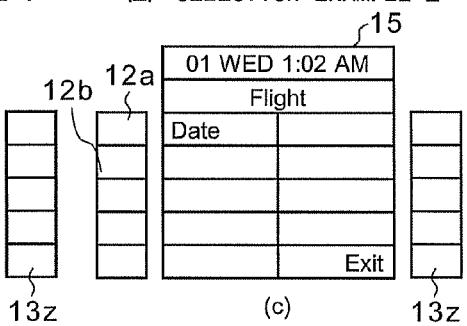
(c)
(3) SCROLL DISPLAY EXAMPLE
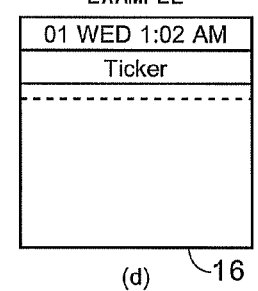
(d)

Fig. 4
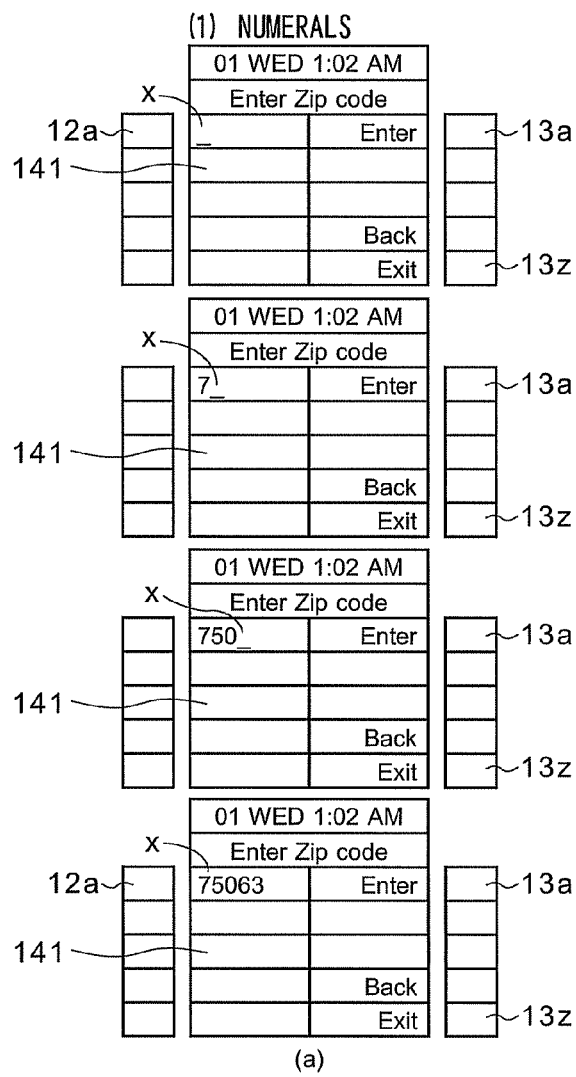
(a)
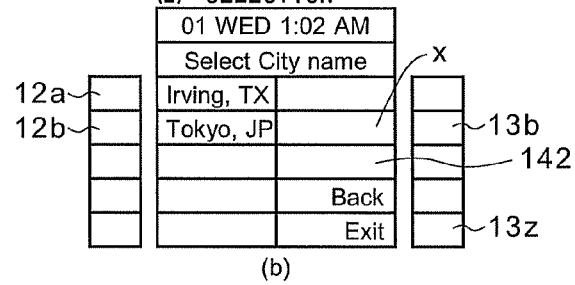
(b)
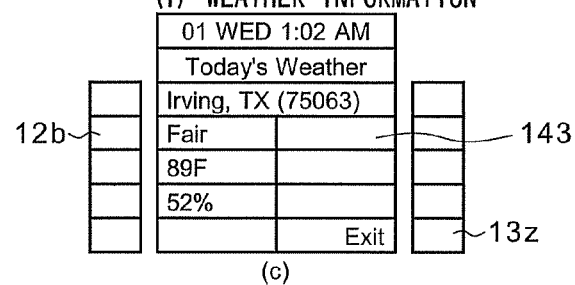
(c)

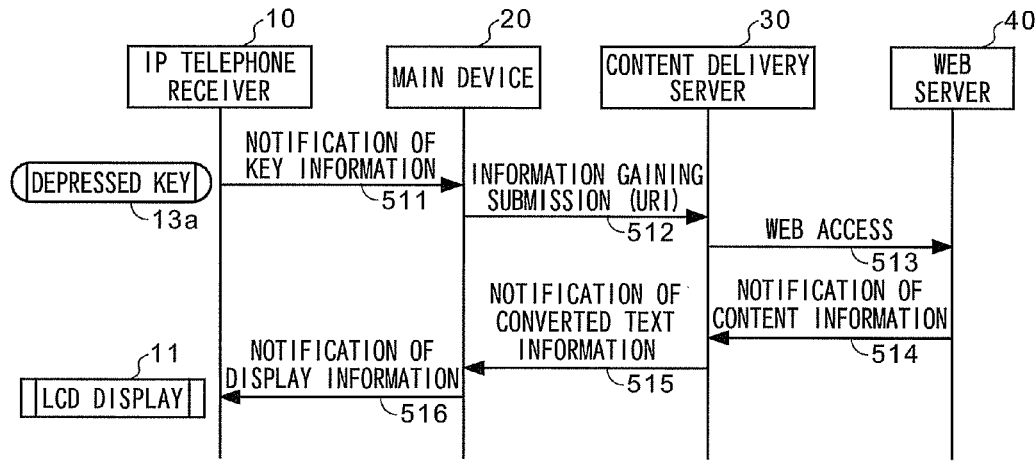
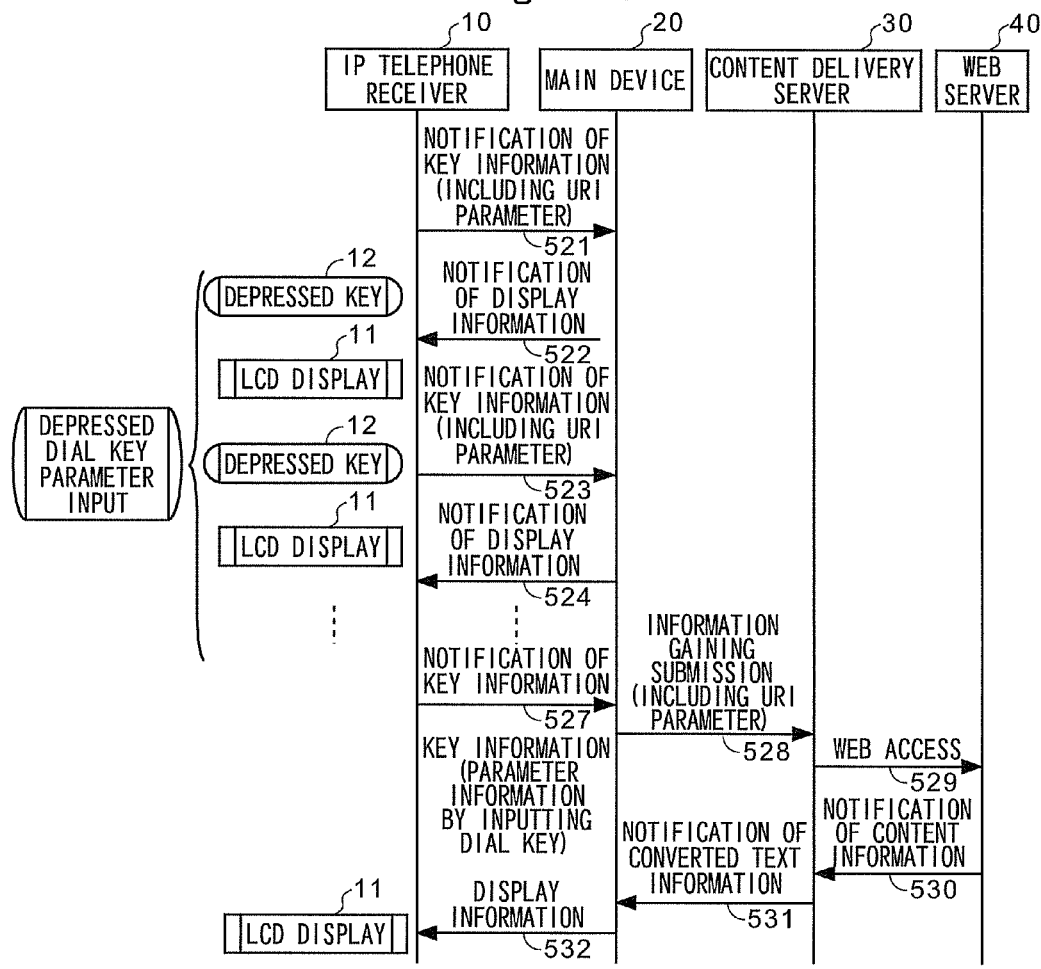

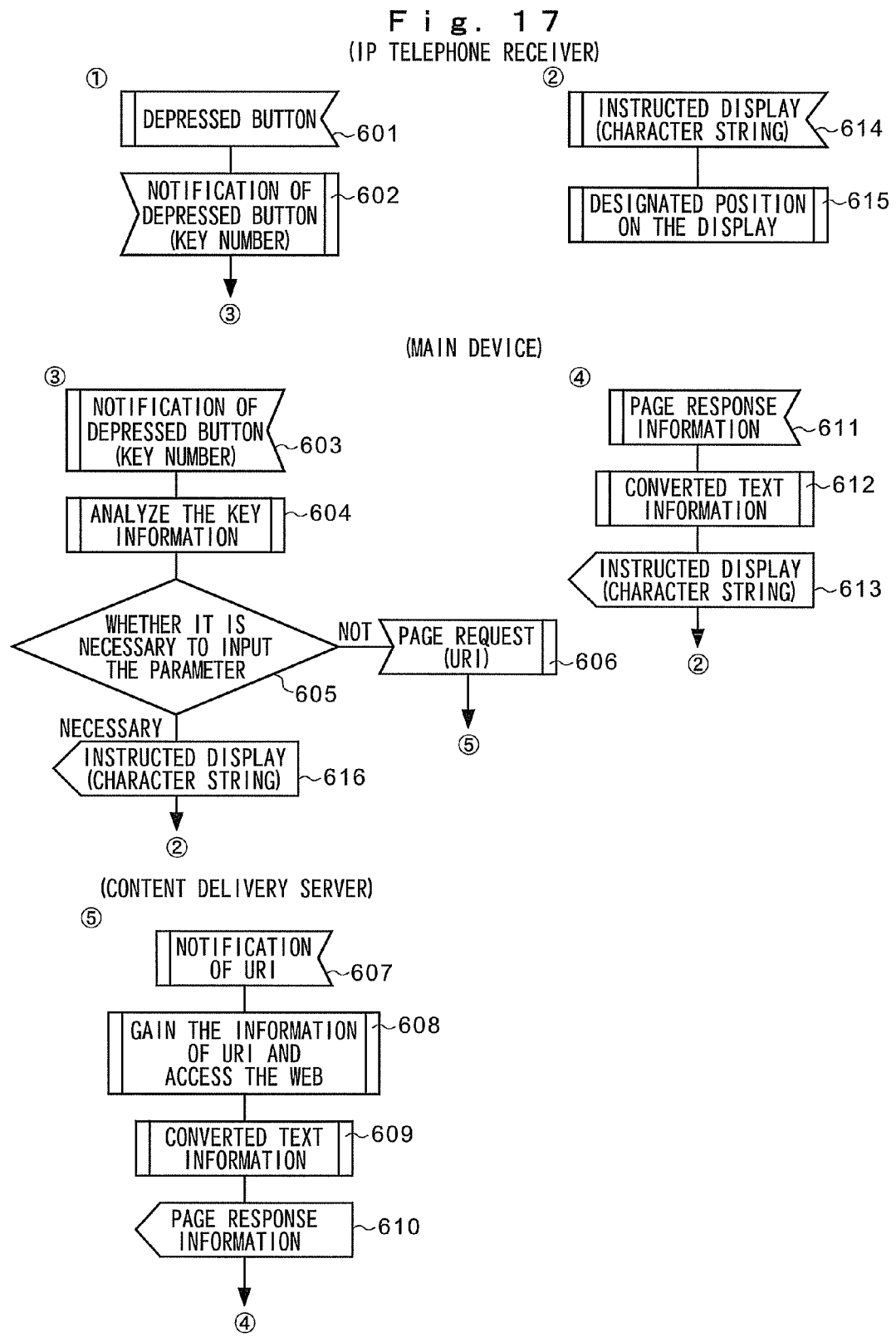

CONTENT DISPLAY DEVICE AND CONTENT DISPLAY METHOD

The present application claims priority of Japanese patent application Serial No. 2008-194756, filed Jul. 29, 2008, the content of which is hereby incorporated by reference in its entirety.

BACKGROUND OF THE INVENTION

1. Field of the Invention

The present invention relates to a content display device in which rather than using a special device such as a personal computer for information provided on the Internet, text information of a WEB content is made displayable on a telephone terminal under the control of a main device, and the present invention relates also to a content display method therefor.

2. Description of the Related Art

For example, in private exchange systems used by a service provider, telephone receivers are provided, as telephone terminals (extension terminals), to a PBX (Private Branch Exchange) or a main device. The telephone terminal and an external communication network, such as a public network, and the telephone terminals are switched and connected with each other by the PBX or the main device so as to enable communication therebetween. In this type of system, a telephone receiver provided with a liquid crystal display (LCD) as a display unit for displaying a call destination or a call source is used as a telephone terminal.

In such a private exchange system, the information displayed on the display unit of the telephone terminal is mainly that which is unique in the system such as information about telephone numbers, times, and operation states of a call destination and a call source. In other words, such information is not inherently that which is obtained from outside by accessing a homepage, etc., on the Internet.

As a result, Patent Document 1 proposes a digital exchange device in which real-time information provided from an information providing server on the Internet is designed to be displayed on a display unit (LCD) of a telephone terminal and also an information providing system.

This digital exchange device is that which accommodates a telephone terminal having a display unit and is connected via a predetermined communication network to a server device for providing predetermined real-time information. The digital exchange device includes the following configuration of:

acquisition-request sending-out means for periodically sending out an acquisition request for real-time information to the server device via the communication network;

real-time information receiving means for receiving the real-time information sent from the server device via the communication network in response to sending-out of the acquisition request;

format-converting means for converting the real-time information received by the real-time information receiving means into a format usable in a telephone terminal;

real-time information storing means for storing the real-time information converted by the format-converting means; and real-time information displaying means for sending out the real-time information stored by the real-time information storing means to the telephone terminal so as to be displayed on a display unit.

According to the aforementioned configuration, the real-time information provided from the server device will be automatically acquired via the communication network by periodically sending out the acquisition request to the server device. The real-time information is converted into a format displayable on the telephone terminal and accumulated in a memory of the digital exchange device. The real-time information accumulated in the memory is transmitted to the telephone terminal and displayed on the display unit.

Therefore, a user requires no operation for accessing the server device on the communication network and is able to acquire in a timely manner the real-time information provided by the server device at all times. The real-time information incoming from the server device via the communication network is converted into a format for the telephone terminal, and then, sent out to the telephone terminal. Thus, a processing load of the telephone terminal can be kept low and a new communication infrastructure does not need to be constructed for acquiring the real-time information, thereby implementing the system at a low cost.

Patent Document 1: Japanese Published Unexamined Patent Application No. 2003-70036

However, according to the aforementioned device, the user requires no operation for accessing the server device on the communication network and is able to acquire in a timely manner the real-time information provided by the server device at all times, whereas there is a problem that the user is not able to select various kinds of information that the user wishes to obtain because it is not configured so as to acquire the information needed by the user at a time needed by the user.

That is, there is desired a system in which improvement and convenience of operability are secured at the time of browsing information when acquiring necessary information selected by the user from an information providing server on the Internet as in a case of a data communication system using a personal computer with a simple configuration not needing a personal computer.

SUMMARY OF THE INVENTION

An object of the present invention is to provide a content display device in which real-time information provided from an information providing server on the Internet can be displayed on a display unit of the telephone terminal by a user selection with good operability by a simple configuration, and also provide a content display method therefor.

In order to achieve the aforementioned object, the present invention of claim 1 is a content display device including: a main device provided with at least one telephone terminal including a display unit for displaying a content and being brought under control; and a content delivery server for delivering a content to the main device. The content display device is characterized by including each of the configurations below.

A content display device, comprising:

a main device provided with at least one telephone terminal including a display unit for displaying a content and being brought under control; and a content delivery server for delivering the content to the main device, wherein the content delivery server comprises: an HTTP client unit for exchanging information with a plurality of WEB servers on the Internet or on a LAN by using HTTP;

a content converting unit for converting data received from the WEB servers via the HTTP client unit into text information which is a documentary format that can be interpreted by the main device and the telephone terminal; and an HTTP server unit for exchanging information with the main device by using the HTTP, the main device comprises: a content-display control unit for acquiring a content and exchanging information about a content delivery by using the HTTP with the content delivery server and for editing so that the content acquired from the content delivery server is suitably displayed for the display unit of each telephone terminal;

a transmission control unit for analyzing from which telephone terminal a content acquisition request is made and for delivering content information being edited by the content-display control unit and being suitable for the display unit of each telephone terminal; and a storage unit for storing content request information including a location of the content delivery server for delivering the text information and a parameter number (including a case that a parameter is zero) necessary at the time of obtaining the content information from the content delivery server, and the telephone terminal displays on the display unit a plurality of tables of contents about the content information from the transmission control unit and a parameter input window, and is provided with a button unit for selecting the tables of contents and finalizing the parameter at a position near the display unit corresponding to the tables of contents and the parameter input window.

The present invention of claim 2 is the content display device according to claim 1, wherein the main device includes a selection parameter storage unit for storing parameters selected in a plurality of immediately previous number of times, and the display unit is configured to simultaneously display the parameters selected in the plurality of immediately previous number of times at the time of displaying the parameter input window.

The present invention of claim 3 is the content display device according to claim 1, wherein in the main device, the telephone terminal is configured to include a function for accumulating therein the text information sent from the main device and repeatedly displaying the accumulated information in a self-propelled style, when the parameter number necessary at the time of obtaining the content information from the content delivery server is zero.

The present invention of claim 4 is the content display device according to claim 3, wherein the main device is configured to include a function for performing an acquisition request for the text information to the content delivery server at regular intervals.

The present invention of claim 5 is a content display method of a content display device, the content display device comprising:

a main device provided with at least one telephone terminal including a display unit for displaying a content and being brought under control;

a content delivery server for delivering content information to the main device; and the content information obtained by the content delivery server from the WEB server being displayed on the display unit of the telephone terminal, the content display method, comprising the main device being storing, as content request information, a location of the content delivery server and a parameter number (including a case that the parameter is zero) necessary at the time of obtaining the content information from the content delivery server; and in the telephone terminal that requests the content information, selecting a table of contents;

sequentially inputting a parameter necessary at the time of obtaining information of the selected table of contents;

when all the parameters necessary at the time of obtaining the content information (when the parameter number is zero, there is no input parameter) are input, outputting the content request information in which the selected table of contents recorded in the main device and all the necessary parameters are finalized, to the content delivery server;

converting the content information obtained from the WEB server by the content delivery server that has received the content request information, into text information; and displaying the text information on the display unit of the telephone terminal that has requested the content information via the main device.

According to the invention of claim 1, it is possible to convert real-time information provided from an information providing server on the Internet into text information in a content converting unit of a content delivery server and to display the text information on a display unit of a telephone terminal via the main device.

At this time, a location of a content delivery server for delivering the text information and a parameter number (including a case that the parameter is zero) required at the time of obtaining the content information from the content delivery server are stored as content request information, and when all the parameters are finalized, access (acquisition request for the text information) is made from the main device to the content delivery server side. As a result, compared to a case that access is made to the content delivery server and a WEB server at each parameter input, a communication load in the main device is alleviated so that good responsiveness of an information display to the telephone terminal can be achieved, and also the structure of the main device can be simplified.

When a plurality of tables of contents displayed on the display unit or a button unit provided on the telephone terminal side corresponding to a parameter input window is operated, a user selects detailed information that the user wishes to acquire. Thus, good operability at the time of displaying the content information on the display unit can be achieved.

According to the invention of claim 2, the parameter input in a plurality of immediately previous number of times is displayed on the display unit, and thereby, the display of the necessary content information is enabled by depressing the corresponding button unit without inputting the parameter identical to that which is displayed. Thus, good operability at the time of displaying the content can be achieved.

According to the invention of claim 3, accumulated text information is repeatedly scroll-displayed in a self-propelled style. Thereby, even when a delivered information amount is large, the content can be scrolled and displayed on the display unit.

According to the invention of claim 4, when displaying news, etc., on the display unit, automatically updated information (real-time information) can be delivered to a telephone terminal side at any time.

According to a method of the invention of claim 5, when converting information from a WEB server into text information by a content delivery server so as to be displayed on the display unit of the telephone terminal via the main device, if all the parameters necessary for acquiring the content information are finalized, content request information is output from the main device to the content delivery server and a content information delivery is received. Therefore, it is possible to shorten a time during which a session is occupied between the main device and the content delivery server, and thus, even when a plurality of telephone terminals have made access, the convergence of establishing the session can be avoided, thereby implementing improvement of reliability when transmitting and receiving the information.

BRIEF DESCRIPTION OF THE DRAWINGS

FIG. 2 is a plane descriptive diagram showing the periphery of a display unit of an IP telephone receiver used in the content display device of the present invention.

FIG. 3(a) to FIG. 3(d) are plane descriptive diagrams for describing a screen on a display unit of the IP telephone receiver.

FIG. 4(a) to FIG. 4(c) are plane descriptive diagrams for describing the screen on the display unit of the IP telephone receiver.

FIG. 15 is a sequence chart for describing the operation of the content display device.

FIG. 16 is a sequence chart for describing the operation of the content display device.

FIG. 17 is a flowchart for describing the operation of the content display device.

DETAILED DESCRIPTION OF THE PREFERRED EMBODIMENTS

Figure 1:
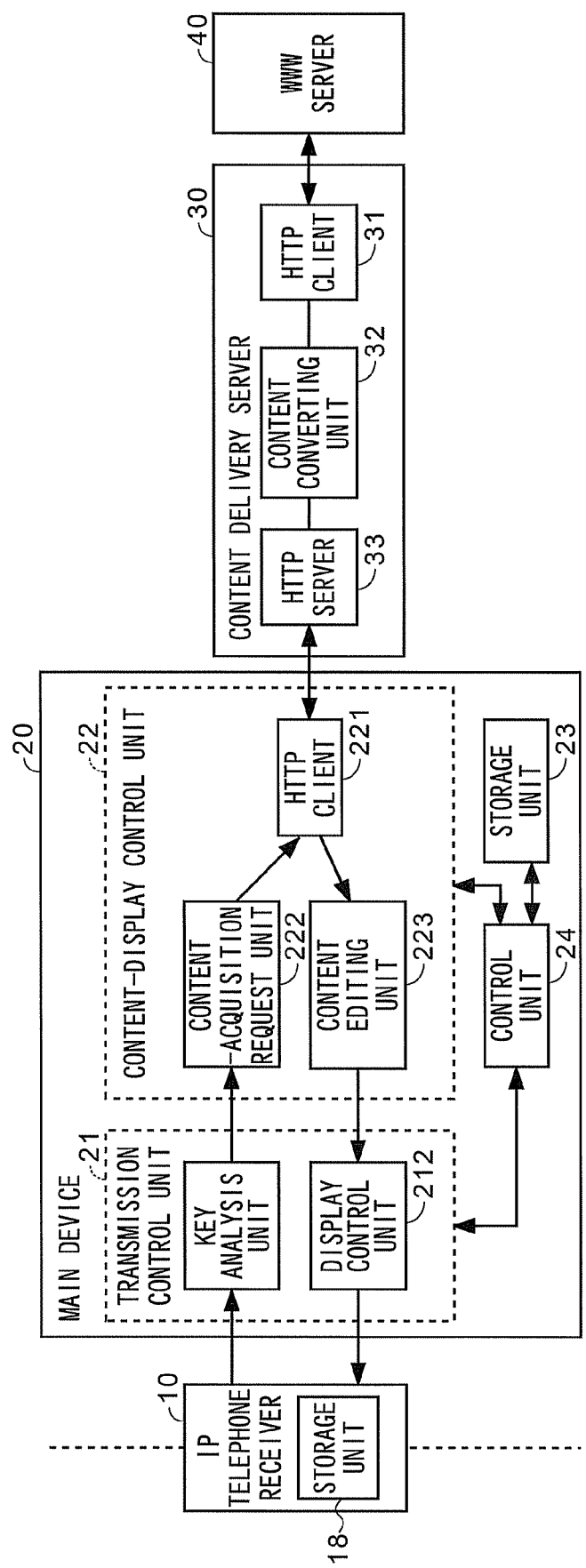
FIG. 1 is a block descriptive diagram showing the configuration of a content display device according to an embodiment of the present invention.

Hereinafter, an example of an embodiment of a content display device of the present invention will be described with reference to FIG. 1 and FIG. 2. FIG. 1 is a block diagram showing the whole configuration of the content display device of the present invention, and FIG. 2 is a plane descriptive diagram showing a display unit of an IP telephone receiver.

The content display device is configured by: a plurality of IP telephone receivers (telephone terminals) loused as terminal devices; a main device 20 for switching and connecting between each IP telephone receiver 10 and an external communication network such as a public network, etc., and between the IP telephone receivers with one another; and a content delivery server 30 for delivering content information to the main device 20.

The main device 20 is connected to the content delivery server 30 and the content delivery server 30 is connected to a WEB server 40 for providing the content information via the Internet. Types of information (weather information, flight information, and news information) displayable on the IP telephone receiver side are determined in advance, and information about a location of the WEB server 40, etc., which is a connection destination, is stored in the main device 20.

The WEB server 40 is designed to provide real-time content information in response to an incoming request signal via the main device 20 and the content delivery server 30 to a request source via the Internet.

The main device 20 is provided with a mode for delivering the content information in response to a request from each IP telephone receiver 10 and a mode for delivering the same content information to all the IP telephone receivers 10. The mode is set during an initial setting of the main device 20.

A data communication between the main device 20 and IP telephone receiver 10 is performed by a conventional transmission system using TCP/IP, for example.

A data communication between the main device 20 and the content delivery server 30 is performed by using HTTP, for example.

The main device 20 accommodates a plurality of IP telephone receivers 10 via an extension, is provided with a function, as a basic function, of switching and connecting between the IP telephone receivers 10 with one another and between these IP telephone receivers 10 and a subscriber line of a public network (not shown) in response to transmitting and receiving calls, and also is configured so that the information can be exchanged between the IP telephone receiver 10 and the content delivery server 30.

In order to display the information delivered from the main device 20, each IP telephone receiver 10 includes, a display unit 11 configured by a liquid crystal display as shown in FIG. 2. At a lower position of the display unit 11, a push-type dial key in which "1, "2," "3," "4," "5," "6," "7," 8," "9," "*," "0," and "#" are aligned in 4 rows 3 columns is set up. When an input switch button (not shown) arranged in each IP telephone receiver 10 is pushed down, alphabetic letters A to Z can be input from the dial key as is realized in a cellular telephone receiver.

The display unit 11 is able to display a plurality of rows, and is configured so that according to the types of displayed information, right and left sections are divided in each row so that different data can be respectively displayed.

On each IP telephone receiver 10, a menu switch button (not shown) for displaying the content information on the display unit 11 is arranged, and thereby, a normal telecommunication mode and an information display mode can be switched.

On both sides for each row displayed on the display unit 11, left button units 12 and right button units 13 are arranged. These left button units 12 and the right button units 13 are configured to serve, in a start screen (initial display screen) of the display unit 11, as operation buttons for selecting (or finalizing) a parameter input in a parameter input window for obtaining table of contents and the content information described later displayed on the display unit 11. When operating any of these operation buttons, the selected information is output to the main device 20 and stored on the main device 20 side.

According to such a configuration, each IP telephone receiver 10 is configured so that a plurality of tables of contents are displayed on a start screen of the display unit 11, the types of contents are selected by left button units 12 and the right button units 13, and information desired to be finally obtained is displayed on the display unit 11 by inputting the parameter for obtaining the content information.

For example, when displaying news information on the display unit 11 of the IP telephone receiver 10, the text information sent from the main device 20 is accumulated in a storage unit 18, and the accumulated information is repeatedly displayed in a self-propelled style. A self-propelled speed when displaying a character string on the display unit 11 in a self-propelled style is configured to be changeable on the IP telephone receiver 10.

When the accumulated text information is repeatedly displayed in a self-propelled style, the content can be displayed on the display unit 11 even when an information amount is large. This display method is suitable for displaying news information, etc.

Further, when the parameter input is necessary in order to obtain certain information, the information desired to be finally obtained can be displayed by sequentially selecting and narrowing a condition or parameter by the left button unit 12 or the right button unit 13. In this case, a parameter number (including a case that the parameter is zero) necessary for obtaining the content information from the WEB server 40 via the content delivery server 30, together with a location of the content delivery server 30 for delivering the text information, is stored in the main device 20 as the content request information, and when all the parameters are finalized, access (acquisition request for the text information) is made from the main device 20 to the content delivery server 30 side.

That is, when the button units 12 and 13 arranged on the telephone terminal side corresponding to the plurality of tables of contents and parameter input windows displayed on the display unit 11 are operated, it becomes possible to easily select and operate the detailed information that the user desires to acquire with a kind of clicking feeling.

Also, on the display unit 11, when the data is divided and displayed on the right and left and the corresponding button units are arranged, a large number of tables of contents can be displayed on the screen, and the types of selectable information increase. Thus, the usability can be improved.

The display method of the text information displayed on the display unit 11 is described in detail later.

In the aforementioned example, the shape of each of the left button units 12 and the right button units 13 is squared. However, any shape that can be placed to correspond to each row may be acceptable, and thus, a circular shape, etc., can be possible.

The main device 20 is configured by: a transmission control unit 21 for exchanging information with each IP telephone receiver 10 side; a content-display control unit 22 for exchanging information with the content delivery server 30 side; a storage unit 23 for storing information necessary for exchanging information with the content delivery server 30 side; and a control unit 24 for controlling the whole device.

The content-display control unit 22 includes: an HTTP client 221 for acquiring a content and exchanging information about a content delivery with the content delivery server 30 by using HTTP; a content-acquisition request unit 222 for requesting the content acquisition to the content delivery server 30 by receiving the content acquisition request from the IP telephone receiver 10 side; and a content editing unit 223 for editing so that the content information that is acquired from the content delivery server 30 and that is converted into the text information is a display suitable for the display unit 11 of each IP telephone receiver 10.

In the content editing unit 223, the text information acquired from the content delivery server 30 is subjected to an editing process for formatting data that is displayed on the display unit 11 in a plurality of IP telephone receivers 10 under the control of the main device 20.

The detail of the data obtained by being formatted is described below.

The transmission control unit 21 analyzes which IP telephone receivers 10 send the content acquisition request, and includes: a key analysis unit 211 for outputting to the content-acquisition request unit 222 of the content-display control unit 22; and a display control unit 212 for delivering the content information, which is edited in the content editing unit 223 of the content-display control unit 22 and which is suitable for the display unit 11 of each IP telephone receiver 10, to the IP telephone receiver 10 from which the content acquisition request is made. The display control unit 212 instructs a screen display for accepting the parameter necessary for accessing the WEB server 40 to the IP telephone receiver 10 from which the content acquisition request is made.

The storage unit 23 of the main device 20 stores the location of the content delivery server 30 for delivering the text information by an IP address or a domain name, and also, stores, as the content request information, the parameter number (including a case that the parameter is zero) necessary for obtaining the content information from the WEB server 40 via this content delivery server 30. A URI for accessing the WEB server 40 for delivering the content information is also stored.

When there is a content acquisition request from the IP telephone receiver 10, according to the parameter number necessary at the time of obtaining the content information stored in the storage unit 23, the control unit 24 determines whether all the necessary parameters have been input from the IP telephone receiver 10, and notifies the content delivery server 30 of the URI for accessing the WEB server 40 capable of delivering the requested content.

The main device 20 that has received the content acquisition request automatically requests an HTTP server 33 of the content delivery server 30 to obtain the text information at regular intervals, according to the types of the content information displayed on the display unit, and is able to deliver the latest information (real-time information) to the IP telephone receiver 10 side.

The content delivery server 30 receives the delivery of various types of information from the WEB server 40 on the Internet or on the LAN, and is provided with: an HTTP client unit 31 for exchanging information with the WEB server 40 by using HTTP; a content converting unit 32 for converting the content information received from the WEB server 40 via the HTTP client unit 31; and an HTTP server unit 33 for exchanging information with the main device 20 by using HTTP.

The HTTP server unit 33 receives from the main device 20 the content request information which includes a URI, etc., for accessing the WEB server 40 capable of delivering the requested content, when all the parameter numbers necessary for obtaining the content information are input from the IP telephone receiver 10.

The HTTP client unit 31 receives the content request information from the main device 20, extracts WEB address information from the URI information notified by the main device 20, accesses the WEB server 40 of the address, and also obtains the content information from the WEB server 40.

The content converting unit 32 converts the content information received from the WEB server 40 into the text information, i.e., a documentary format that can be interpreted by the main device 20 and the IP telephone receiver 10.

That is, in response to sending-out of the acquisition request from the main device 20, the HTTP client unit 31 receives the content information sent from the WEB server 40 via the Internet and sends out the content information to the content converting unit 32.

The content converting unit 32 cuts out only the text information from the news information received by the HTTP client unit 31, and converts the text information into text data displayable on the display unit 11 of the IP telephone receiver 10. At the time of the conversion, character information consisting only of the necessary title portion and news main body is extracted from the acquired news information, for example, and line break codes included in the main body are deleted, thereby converting into data in which character information is seamlessly arranged. At the time of converting to the text information, it may be possible to perform a process in which the line break codes are replaced with spaces.

The HTTP server unit 33 delivers the text information converted in the content converting unit 32 to the main device 20. The delivered text information is delivered to the IP telephone receiver 10 via the main device 20, and is stored in the storage unit 18 of the IP telephone receiver 10.

Next, the display method of the text information on the display unit 11 is described in detail with reference to FIGS. 3(a) to 3(d) to FIG. 6.

On an initial display screen of the display unit 11, a date and a time are displayed in the top row; characters of "Favorite Menu" are displayed in a second row; and a table of contents divided into right and left can be displayed (a maximum of 10 pieces of content can be displayed) in a row next under the second row, as shown in FIG. 3(a). In this example, there are displayed characters of: Weather (weather information) in a first row on the left; Flight (flight information) in a second row on the left; and Ticker (news information) in a first row on the right.

In this state, when a left button unit 12a located on the left of the Weather (weather information) is pushed down, a screen 14 displayed in a (1) selection example 1 appears (FIG. 3(b)).

On this screen 14, there are displayed Zip (post code) in a first row on the left and City (city name) in a second row of the left, and after selecting the Zip (post code) and the City (city name) by the left button unit 12a or a left button unit 12b, a numeral can be input from a dial key in the corresponding cell on the right.

On the initial display screen of FIG. 3(a), when the left button unit 12b located on the left of Flight (flight information) is pushed down, a screen 15 displayed in a (2) selection example 2 appears (FIG. 3(c)).

On this screen 15, Date (date) is displayed in a first row on the left, and after selecting the Date (date) by the left button unit 12a, numerals (YYYY, MM, DD) can be input from the dial key in the corresponding cell on the right.

On the initial display screen of FIG. 3(a), when the right button unit 13a located on the right of Ticker (news information) is pushed down, a screen 16 displayed in a (3) scroll display example appears (FIG. 3(d)). On this screen 16, only a first row of the screen 16 is used, and in this state, the text information accumulated in the storage unit 18 of the IP telephone receiver 10 is repeatedly displayed in a self-propelled style.

Characters "Exit" are displayed in the lowest position on the right of each screen on the display unit 11 in FIGS. 3(a) to 3(d), and when a corresponding button unit 13z is pushed down, the screen is returned to the initial display screen.

Subsequently, in the screen 14 (FIG. 3(b)) for obtaining the weather information, after selecting the Zip (post code) or the City (city name) by the left button unit 12a or the left button unit 12b, parameters are input by the dial key. This input example will be described with reference to FIG. 4.

On the screen 14 (FIG. 3(b)), when the left button unit 12a is pushed down to select the input of Zip (post code), a post-code input screen 141 is displayed on the display unit 11 (FIG. 4(a)). After the left button unit 12a corresponding to the cell on the left of the post-code input screen 141 is pushed down, a cursor is displayed within the cell, as shown in FIG. 4(a), and the displayed portion results in a parameter input window x. When the dial key is subsequently pushed down, numerals can be input (in this example, numerals of "75063" are input). After the input is completed, when the right button unit 13a corresponding to "Enter" is pushed down, a weather information screen 143 is displayed on the display unit 11 (FIG. 4(c)).

Figure 5:
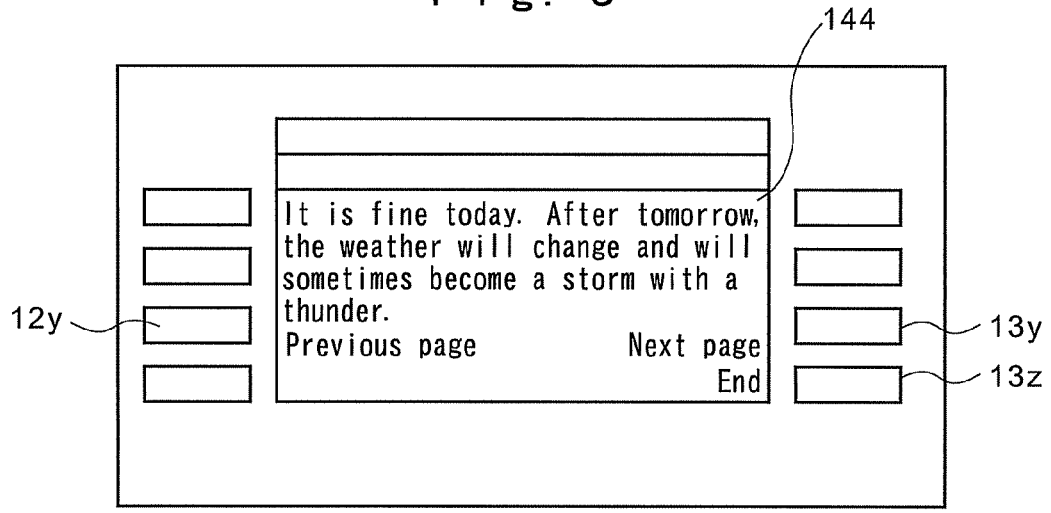
FIG. 5 is a plane descriptive diagram showing the display unit of the IP telephone receiver.

On the weather information screen 143, Fair (weather information), temperature information, and humidity information are displayed. When the left button unit 12b next to the Fair (weather information) is pushed down, a weather briefing screen 144 or final screen shown in FIG. 5 is displayed. On the weather briefing screen 144, a weather briefing up to 10,000 characters is displayed. When the characters do not fit within the screen, a right button unit 13y corresponding to a "Next page" display is pushed down, so that the next sentences are displayed. Also, when a left button unit 12y corresponding to a "Previous page" display is pushed down, sentences in the last frame are displayed. When a user wishes to end the display, a right button unit 13z may be pushed down.

When the left button unit 12b is pushed down to select the input of the City (city name) on the screen 14 (FIG. 3(b)), a city selection screen 142 is displayed on the display unit 11 (FIG. 4(b)). When the left button unit 12b is pushed down, a character can be input in the parameter input window x, and when the right button unit 13b is pushed down in a state that the city name is input and displayed, the weather information screen 143 similar to that at the time of inputting the post code is displayed on the display unit 11 (FIG. 4(c)).

Subsequently, on the screen 15 (FIG. 3(c)) for obtaining flight information, after the Date (date) is selected by the left button unit 12a, the parameters are input by the dial key. This input example will be described with reference to FIG. 6.

Figure 6:
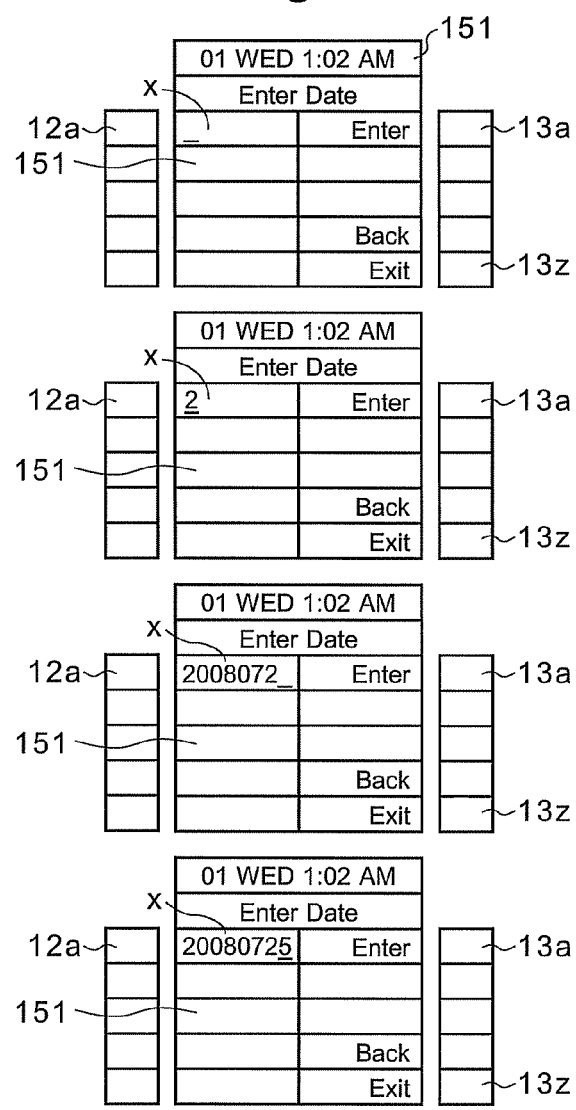
FIG. 6 is a plane descriptive diagram for describing the screen on the display unit of the IP telephone receiver.

On the screen 15 (FIG. 3(c)), when the Date (date) is selected by depressing the left button unit 12a, a date selection screen 151 is displayed on the display unit 11 (FIG. 6).

Figure 7:
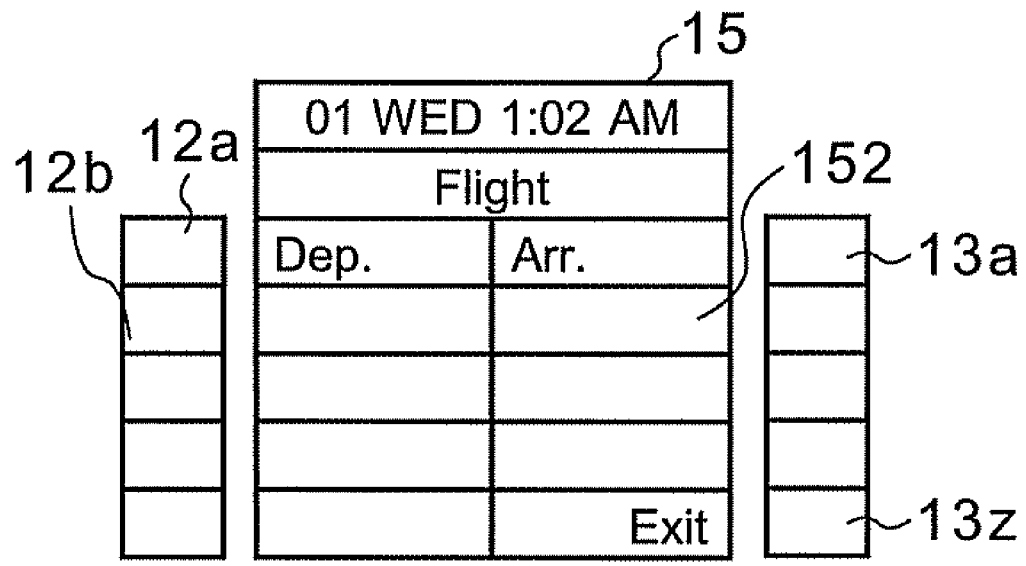
FIG. 7 is a plane descriptive diagram for describing the screen on the display unit of the IP telephone receiver.

After the left button unit 12a corresponding to the cell on the left of the date selection screen 151 is pushed down, a cursor is displayed within the cell, as shown in FIG. 6, and the displayed portion results in a parameter input window x. When the dial key is subsequently pushed down, numerals can be input (in this example, numerals of "20080725" are input). After the input is completed, when the right button unit 13a corresponding to "Enter" is pushed down, a departure/arrival information screen 152 is displayed on the display unit 11 (FIG. 7).

Figure 8:
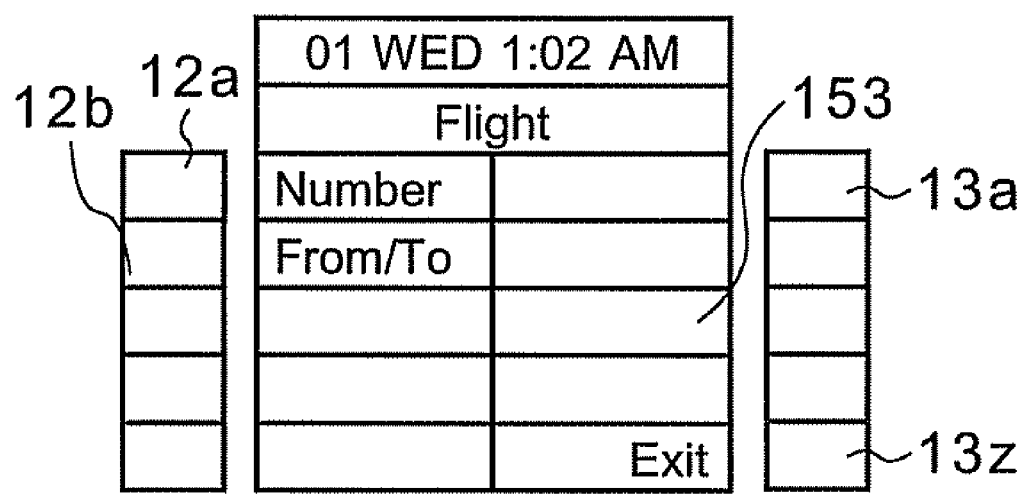
FIG. 8 is a plane descriptive diagram for describing the screen on the display unit of the IP telephone receiver.

On the departure/arrival information screen 152, Dep. (Departure) and Arr. (Arrival) are displayed in the top right and left positions of the display unit 11, respectively. When the left button unit 12a corresponding to Dep. (Departure) is depressed, a flight number/airport selection screen 153 as shown in FIG. 8 is displayed. There are displayed a Number (flight number) in a first row on the left and a From/To (departure city/arrival city) in a second row on the left. The Number (flight number) and the From/To (departure city/arrival city) are selected by the left button unit 12a or the left button unit 12b.

Figure 9:
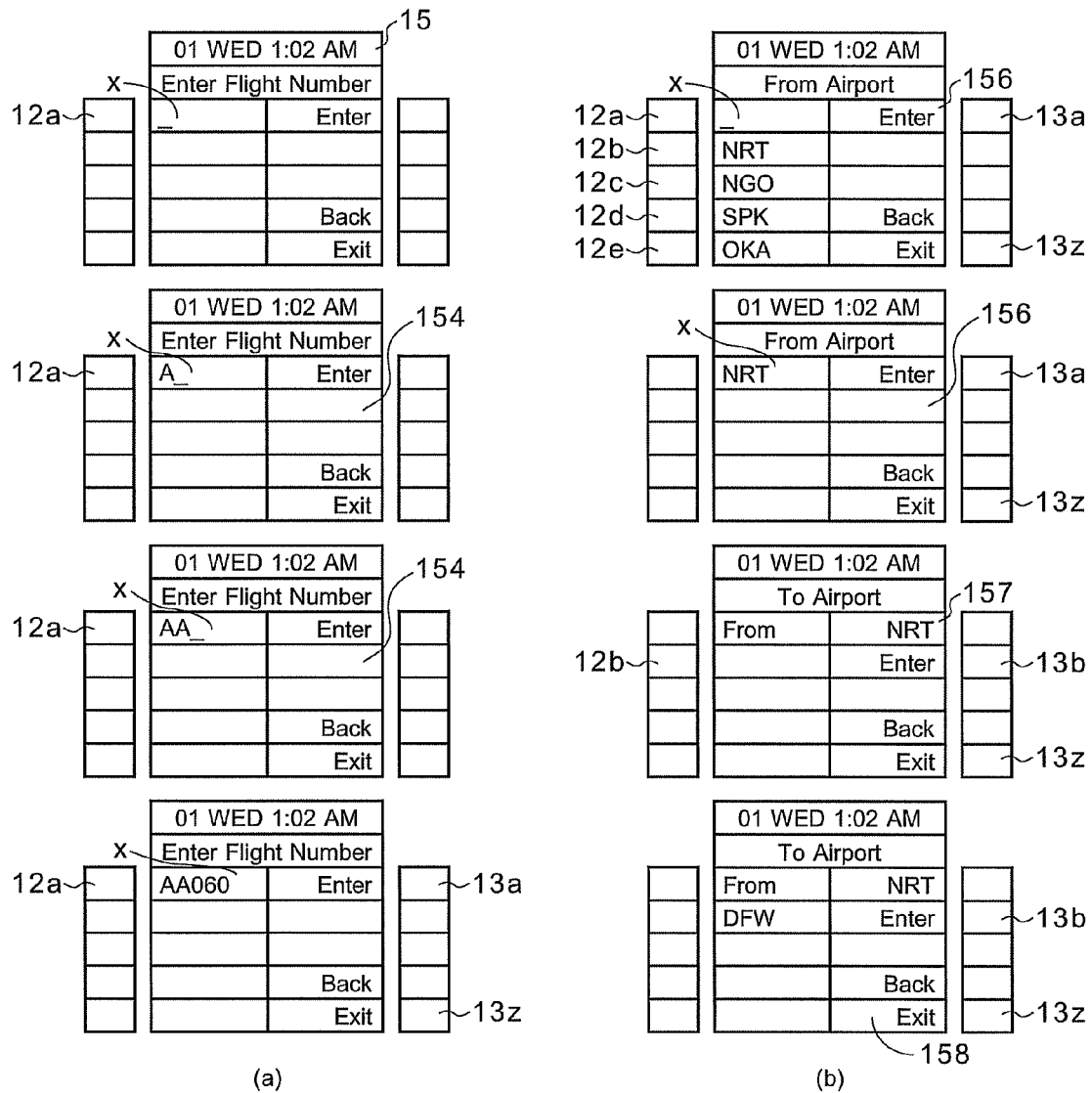
FIG. 9(a) to FIG. 9(c) are plane descriptive diagrams for describing the screen on the display unit of the IP telephone receiver.

When the left button unit 12a is depressed to select the input of Number (flight number) on the flight number/airport selection screen 153 (FIG. 8), a flight-number input screen 154 is displayed on the display unit 11 (FIG. 9(a)).

When the left button unit 12a corresponding to a cell on the left of the flight-number input screen 154 is depressed, the parameter input window x with a cursor being displayed appears, and as shown in FIG. 9(a), the numerals are input by sequentially pushing down the dial key (in this example, numerals of "AA060" are input).

After the input is completed, when the right button unit 13a corresponding to "Enter" is pushed down, a flight information screen 155 is displayed on the display unit 11 (FIG. 9(c)).

On the flight information screen 155, respective information such as AA060 (flight number), a departure city, a departure date and time, and a boarding gate is displayed.

When the left button unit 12b is depressed to select the input of the From/To (departure city/arrival city) on the flight number/airport selection screen 153 (FIG. 8), a departure-city input screen 156 is displayed on the display unit 11 (FIG. 9(b)).

After the left button unit 12a corresponding to a cell on the left on the departure-city input screen 156 is depressed, the dial key is sequentially pushed down, as shown in FIG. 8(b), so as to input a departure city name (three alphabetic characters) (in this example, "NRT" (Narita) are input).

After the input is completed, when the right button unit 13a corresponding to the cell in which "Enter" is displayed is depressed, an arrival-city input screen 157 is displayed on the display unit 11 (FIG. 9(b)).

A departure city name ("From" "NRT") is displayed in the cell at the top position on the arrival-city input screen 157. When the left button unit 12b corresponding to the cell in a second row on the left of the arrival-city input screen 157 is depressed, and thereafter, as shown in FIG. 9(b), the dial key is sequentially pushed down. Thereby, an arrival city name (three alphabetic characters) is input (in this example, "DFW" (Dallas) are input).

After the input is completed, when the right button unit 13b corresponding to "Enter" is depressed, a departure city/arrival city finalizing screen 158 is displayed on the display unit 11 (FIG. 9(b)).

When the departure city and the arrival city are correct, the right button unit 13b corresponding to "Enter" is pushed down in this state. Thereby, the flight information screen 155 is displayed on the display unit 11 (FIG. 9(c)).

On the flight information screen 155, respective information such as a flight number, a departure city, a departure date and time, and a boarding gate is displayed similar to a case of the Number (flight number) search. When there are a plurality of flights, the flights are sequentially switched and displayed.

When the parameter input window x is displayed, characters input as the parameters in a plurality of immediately previous number of times at the time of displaying the same screen may be displayed in a vacant cell portion on the display unit 11. In this case, the parameters selected and input in a plurality of immediately previous number of times are stored on a selected-parameter storage unit within the storage unit 23 of the main device 20.

For example, when the parameter input window x is displayed on the departure-city input screen 156 of FIG. 9(b), "NRT," "NGO," "SPK," and "OKA" input as the parameters in the immediately previous four times are automatically displayed in the position below the parameter input window x. When the automatically displayed city is selected, the left button units 12b, 12c, 12d, and 12e positioned next thereto are depressed, and thereby, the parameter can be designated without inputting the city name. As a result, the same parameter as that which is displayed is selected without being input, and thereby, the necessary content information can be displayed. Thus, good operability at the time of displaying the content can be achieved.

Figure 10:
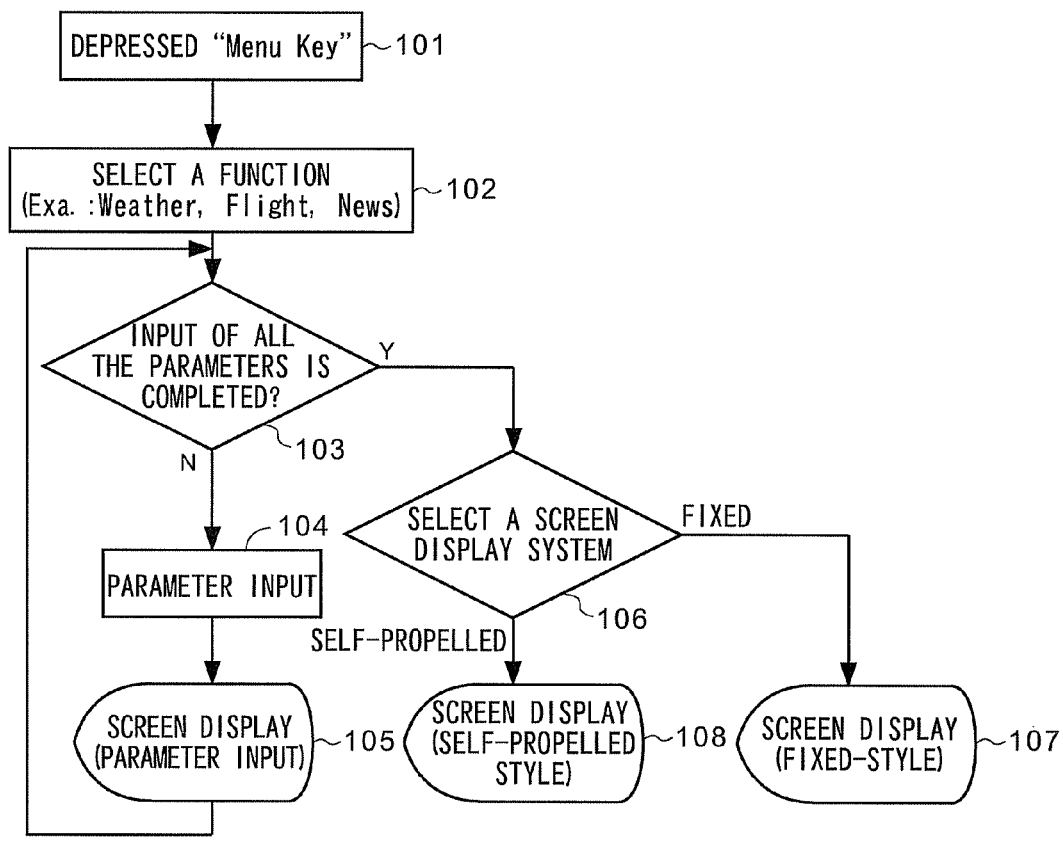
FIG. 10 is a flowchart for describing an operating procedure in the IP telephone receiver.

Next, a procedure for the aforementioned information display in the IP telephone receiver 10 will be described with reference to a flowchart in FIG. 10.

A menu switching button of the IP telephone receiver 10 is depressed to set a mode in which the content information can be displayed on the display unit 11 (step 101).

The necessary information is selected by the left button unit 12 or the right button unit 13 from a menu (for example, information of Weather, Flight, and News) displayed on the display unit 11 (step 102).

In the main device 20, the parameter number necessary for obtaining the selected content information is recognized from the storage unit 23 (when the parameter is 0, it is determined that all the parameters have been input).

It is determined whether the input of all the parameters is completed (step 103), and when the input is not completed, parameter input on the display unit 11 (step 104) and a screen display of the parameter input window (step 105) are repeated.

For example, when the flight information in the aforementioned example is obtained, "date," "departure or arrival," "departure city name," and "arrival city name" are the parameters.

When all the parameters are input, the main device 20 delivers the information, together with the parameter information, to the location, stored in the storage unit 23, of the content delivery server 30. The main device 20 then obtains the content information from the WEB server 40 and selects a screen display system of a case that the content information is displayed on the display unit 11 (step 106). That is, when a plurality of parameters are input to display the content information, a fixed-style screen display in which the display is fixed is used (step 107), and news, etc., are stored in the storage unit 18 on the IP telephone receiver 10 side. When the display is made endlessly, a screen display in a self-propelled style is used (step 108).

Next, a format of the text information in the content editing unit 223 of the main device 20 will be described with reference to FIG. 11 to FIG. 13.

Figure 11:
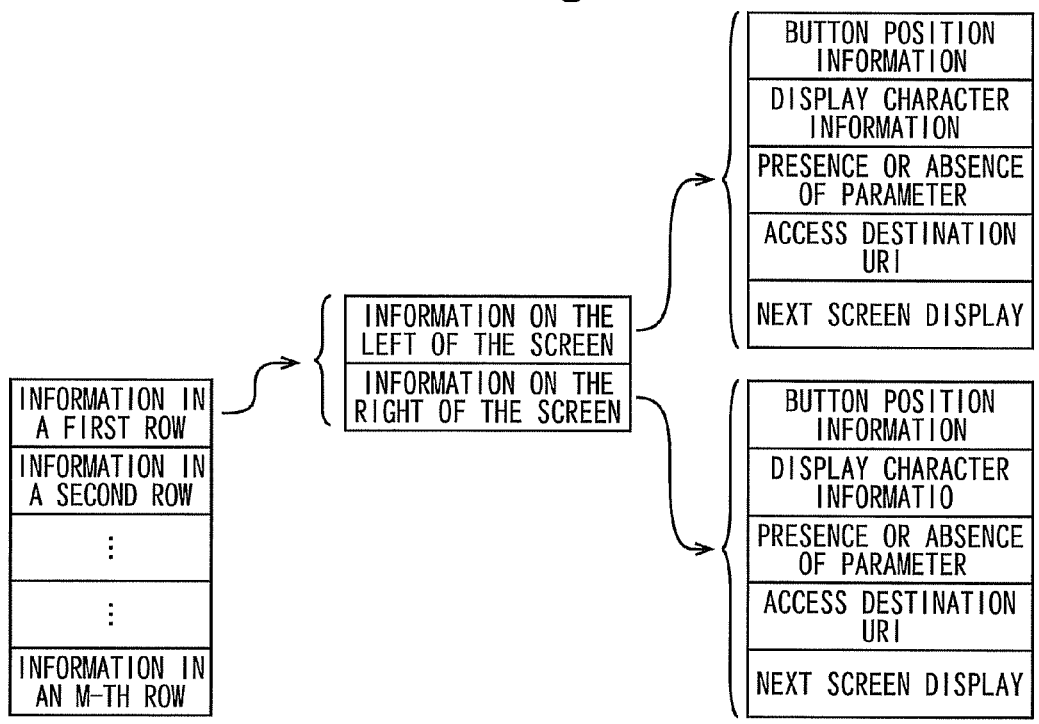
FIG. 11 is a descriptive diagram for describing a format definition of information displayed on the display unit of the IP telephone receiver.

In data that is obtained after being formatted, information in a first row, information in a second row, ¼, and information in an m-th row displayed in the display unit 11 are configured in this order, as shown on the left of FIG. 11. Because the display unit 11 is displayed to be divided into right and left sections, the information in each row is configured by information on the left of the screen and information on the right of the screen, as shown in the center of FIG. 11.

The information on each screen includes: "button position information" indicating a cell corresponding to which button units; "display character information" that serves a character to be displayed within a cell; "presence or absence of parameter" indicating whether to accompany the input of a numeral or a character from pushing down the button unit or the dial key; "access destination URI"; and "presence or absence of next screen table" that serves as information whether a next screen display is necessary by the input of the parameter, as shown on the right of FIG. 11.

The button position information increments from 1 to m from an upper row to a lower row in a case of the left side, and increments from m+1 to n from the upper row to the lower row in a case of the right side.

In the "presence or absence of parameter," "0" means absence and otherwise it means presence. Numerals equal to or more than 1 indicate the parameter number.

In a case of "absence of parameter," the "access destination URI" indicates a home page address (http://www.aaa.co.jp/) of the WEB server 40, and in a case of "parameter is one access destination URI," it indicates an address (http://www.aaa.co.jp/~html) lower by one hierarchy than the home page address.

Figure 12:
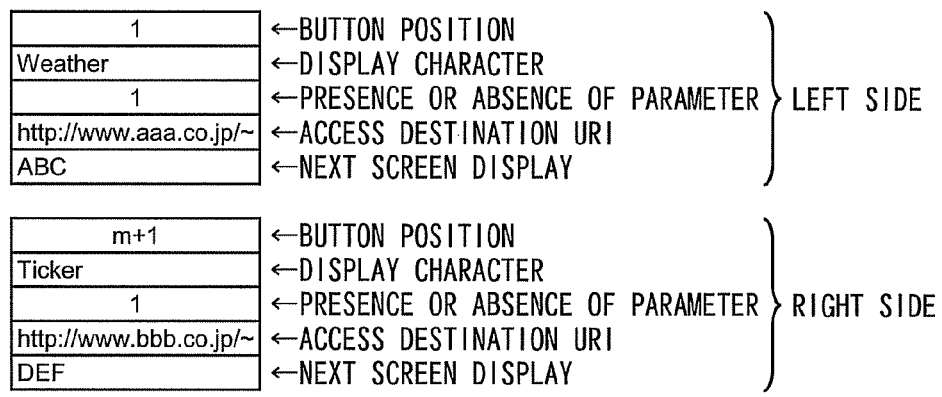
FIG. 12 is a descriptive diagram for describing the format definition of the information displayed on the display unit of the IP telephone receiver.
Figure 13:
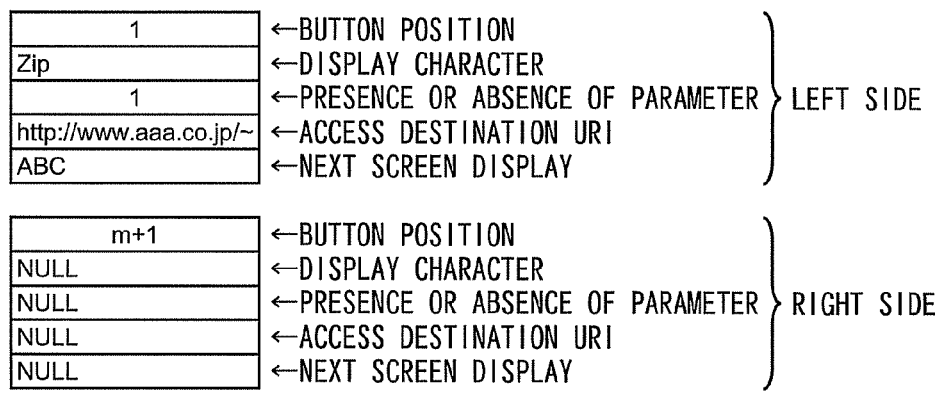
FIG. 13 is a descriptive diagram for describing the format definition of the information displayed on the display unit of the IP telephone receiver.

Therefore, when the data is formatted by the aforementioned definition, data corresponding to the cells displayed on the right and left in a first row on the display unit 11 of FIG. 3(a) is as shown in FIG. 12 while data corresponding to the cells displayed on the right and left in a first row of the screen 14 on the display unit 11 of FIG. 3(b) is as shown in FIG. 13, for example.

Figure 14:
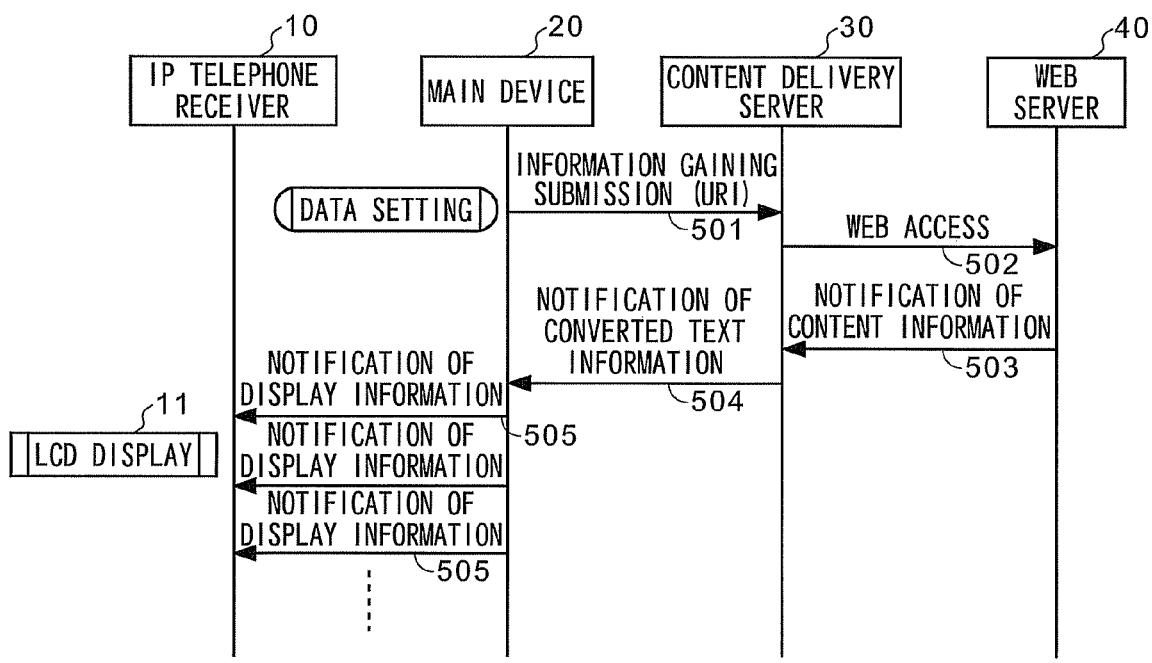
FIG. 14 is a sequence chart for describing an operation of a content display device.

Next, a procedure for displaying the content information on the display unit 11 of the IP telephone receiver 10 by the content display device of the present invention will be described with reference to the block diagram of FIG. 1, the initial display screen of FIG. 3, and sequence charts of FIG. 14 to FIG. 16.

When displaying the content information on the display unit 11 of the IP telephone receiver 10, there are two cases of: (1) simultaneously delivering the same content information to all the IP telephone receivers 10; and (2) performing an acquisition request from the individual IP telephone receivers 10. The case (2) can be subdivided into cases of: (2a) performing only the acquisition request from the individual IP telephone receivers 10 so as to obtain the content information; and (2b) performing the acquisition request of the necessary information by operation (input of parameter) of the button unit or the dial key.

First of all, the aforementioned case (1) of simultaneously delivering the same content information to all the IP telephone receivers 10 will be described with reference to FIG. 14. In this case, in the mode setting of the main device 20, the mode for delivering the same content information to all the IP telephone receivers 10 has been selected in an initial data setting.

In this data setting, for example, an information gaining submission (501) is transmitted from the main device 20 to the content delivery server 30 at regular time intervals, and the content delivery server 30 that receives this request accesses the WEB server 40, i.e., a previously set information supply destination (step 502), so as to obtain the content information (step 503).

In the content delivery server 30, a process for converting the content information into the text information that can be interpreted by the main device 20 and the IP telephone receiver 10 is performed. The converted text information is delivered to the main device 20 (step 504).

In the main device 20, the text information is formatted to data that can be suitably displayed on the display unit 11 of the IP telephone receiver 10, and thereafter, the data is delivered to a plurality of IP telephone receivers 10, respectively (step 505).

In the display unit 11 of the IP telephone receiver 10, the delivered data is stored in the storage unit 18, only a first row of this data is used on the display unit 11, and the text information accumulated in the storage unit 18 of the IP telephone receiver 10 is repeatedly displayed in a self-propelled style.

Next, the aforementioned case (2a) of delivering the content information in which only the acquisition request is performed will be described with reference to FIG. 15.

In this case, a user who uses the IP telephone receiver 10 operates (depresses) the right button unit 13a on the initial display screen (FIG. 3(a)) on the display unit 11 in FIG. 3, and thereby, the corresponding key information (in this case, a request of news information by selecting "Ticker") is notified from the IP telephone receiver 10 to the main device 20 (step 511).

The main device 20 that has received this notification transmits the information gaining submission to the content delivery server 30 (step 512), and the content delivery server 30 that has received the submission accesses the WER server 40, which is an information request destination, included in the information gaining submission (step 513) so as to obtain the content information (step 514).

In the content delivery server 30, a process for converting the content information into the text information that can be interpreted by the main device 20 and the IP telephone receiver 10 is performed, and the converted text information is delivered to the main device 20 (step 515).

In the main device 20, the text information is formatted to the data that can be suitably displayed on the display unit 11 of the IP telephone receiver 10, and thereafter, this data is delivered to the IP telephone receiver 10 from which the acquisition request is issued (step 516).

In the display unit 11 of the IP telephone receiver 10, the delivered data is stored in the storage unit 18, and only a first row of this data is used on the display unit 11 so as to repeatedly display the text information accumulated in the storage unit 18 of the IP telephone receiver 10 in a self-propelled style.

Next, the aforementioned case (2b) of delivering the content information at the time of performing the acquisition request for the necessary information by the operation (parameter input) of the button unit will be described with reference to FIG. 16.

In this case, a user who uses the IP telephone receiver 10 operates (depresses) the left button unit 12a on the initial display screen (FIG. 3(a)) of the display unit 11 in FIG. 3, and thereby, the corresponding key information (in this case, a request for the weather information by selecting "Weather") is notified (key number is notified) from the IP telephone receiver 10 to the main device 20 (step 521).

Upon receipt of a button depressing (key number) notification, in the main device 20, the parameter number necessary for the requested content information is recognized from the storage unit 23. When the parameter input is necessary, a display information notification for displaying the parameter input window for the parameter input is transmitted (step 522).

Corresponding thereto, the IP telephone receiver 10 inputs the parameter to the parameter input window.

That is, on the display unit 11 of the IP telephone receiver 10, when the left button unit 12a located on the left of the Weather (weather information) in FIG. 3(a) is depressed, the screen 14 displayed in the selection example (1) in FIG. 3(b) appears. On this screen 14, there are displayed Zip (post code) in a first row on the left and City (city name) in a second row on the left. The Zip (post code) and the City (city name) are selected by depressing the left button unit 12a or the left button unit 12b, and the numerals or characters (parameters) are input and finalized from the dial key into the parameter input window. These operations are repeated, and thereby, the input of all the parameters is completed. At this time, a notification regarding the key information is issued from the IP telephone receiver 10 to the main device 20 (step 527).

The main device 20 that has received this notification transmits the content request information including the parameter information to the content delivery server 30 so as to perform the information gaining submission (step 528). The content delivery server 30 that has received this request accesses the WEB server 40, included in the information gaining submission, of the information request destination (step 529) so as to obtain the content information to be displayed on the display unit 11 (step 530).

In the content delivery server 30, a process for converting the content information into the text information that can be interpreted by the main device 20 and the IP telephone receiver 10 is performed, and the converted text information is delivered to the main device 20 (step 531).

In the main device 20, the text information is formatted to the data that can be suitably displayed on the display unit 11 of the IP telephone receiver 10, and thereafter, this data is delivered to the IP telephone receiver 10 from which the acquisition request is issued (step 532).

Next, an operation among the IP telephone receiver 10, the main device 20, and the content delivery server 30 to one another at the time of displaying the content information on the display unit 11 of the IP telephone receiver 10 by the content display device of the present invention will be described with reference to a flowchart of FIG. 17.

A user who uses the IP telephone receiver 10 operates (depresses) the left button unit 12a on the initial display screen (FIG. 3(*a*)) of the display unit 11 of FIG. 3 (step 601), and thereby, the corresponding key information (in this case, a request for the weather information by selecting "Weather") is notified (key number is notified) from the IP telephone receiver 10 to the main device 20 (step 602).

Upon receipt of the button depressing (key number) notification (step 603), the main device 20 analyzes the key information (step 604). Through the key information analysis, it is determined whether it is necessary to input the parameter for performing a next screen display (step 605), and when the parameter input is not necessary, the information gaining submission (page request) is performed to the text delivery server 30 (step 606).

The content delivery server 30 is notified of a connection-destination URI by the information gaining submission (page request) (step 607), accesses the WEB server 40 (step 608) so as to obtain the content information, and shapes this information into the text information (step 609). The content delivery server 30 delivers the converted text information to the main device 20 as page response information (step 610).

The main device 20 receives the text information as the page response information (step 611), formats the text information to the data that can be suitably displayed on the display unit 11 of the IP telephone receiver 10 (step 612), instructs the display of the data of the character string converted in shape, and delivers that data to the IP telephone receiver 10 (step 613).

Upon receipt of the data of the character string that is instructed to display (step 614), the display unit 11 of the IP telephone receiver 10 displays the data on a designated position on the display unit 11 (step 615).

In step 605 of the main device 20, as a result of the key information analysis, when it is determined to be necessary to input the parameter for displaying the next screen, it is instructed to display the character string data displayed on the display unit 11 for the parameter input, and this instruction is delivered to the IP telephone receiver 10 (step 616).

The display unit 11 of the IP telephone receiver 10 receives the character string data displayed on the display unit 11 for the parameter input (step 614), and displays the data on the designated position on the display unit 11 (step 615).

According to the aforementioned content display device, at the time of displaying the real-time information provided from the information providing server on the Internet on the display unit 11 of the IP telephone receiver 10, only the text portion of the content information provided from the WEB server 40 is displayed. Thereby, the content display device can be realized with a simple configuration in which a terminal dedicated to WEB browsing, such as a personal computer, is rendered unnecessary.

Also, the parameter is input so that a character portion of the text display displayed on the display unit 11 of the IP telephone receiver 10 and the button units 12 and 13 are associated. Thereby, it is possible to realize an operation that is like clicking a mouse so as to jump a page.

According to the content delivery device of the present invention, the real-time information provided from the information providing server on the Internet can be converted into the text information in the content converting unit of the content delivery server, and the text information can be displayed on the display unit of the telephone terminal via the main device. Thus, it is possible to easily obtain the information from the WEB server without need of a dedicated device such as a personal computer.

At this time, the location of the content delivery server from which the text information is delivered and the parameter number (including a case that the parameter is zero) necessary at the time of obtaining the content information from the content delivery server are stored as the content request information. When all the parameters are finalized, the access (acquisition request of the text information) is made from the main device to the content delivery server side. Thereby, as compared to a case that the content delivery server and the WEB server are accessed at each parameter input, a communication load in the main device is alleviated and good responsiveness of the information display to the telephone terminal can be achieved, and also, the structure of the main device can be simplified.

Also, it is possible to shorten the time used by the main device to occupy a session with the content delivery server, and thus, even when a plurality of telephone terminals have made simultaneous access, the convergence of establishing the session can be avoided, and the reliability at the time of transmitting and receiving the information from the content delivery server can be improved.

Further, when a user operates the button units arranged in the telephone terminal side corresponding to a plurality of tables of contents or parameter input windows displayed on the display unit, the user selects the detailed information that the user wishes to obtain. Thus, good operability at the time of displaying the information on the display unit can be achieved.

What is claimed is:
1. A content display system, comprising:
a main device provided with at least one telephone terminal including a display unit for displaying content; and
a content delivery server for delivering the content to the main device, wherein the content delivery server comprises:
an HTTP client unit for exchanging information with a plurality of WEB servers on the Internet or on a LAN by using HTTP;
a content converting unit for converting data received from the WEB servers via the HTTP client unit into text information which is a documentary format that can be interpreted by the main device and the telephone terminal; and
an HTTP server unit for exchanging information with the main device by using the HTTP,
the main device comprises:

a content-display control unit for acquiring a content and exchanging information about a content delivery by using the HTTP with the content delivery server and for editing so that the content acquired from the content delivery server is suitably displayed for the display unit of each telephone terminal;

a transmission control unit for analyzing from which telephone terminal a content acquisition request is made and for delivering content information being edited by the content-display control unit and being suitable for the display unit of each telephone terminal; and a storage unit for storing content request information including a location of the content delivery server for delivering the text information and a parameter number (including a case that a parameter is zero) necessary at the time of obtaining the content information from the content delivery server, and the telephone terminal displays on the display unit a plurality of tables of contents about the content information from the transmission control unit and a parameter input window, and is provided with a button unit for selecting the tables of contents and finalizing the parameter at a position near the display unit corresponding to the tables of contents and the parameter input window;

wherein the content display control unit of the main device accesses the content delivery server only when all parameters from the telephone terminal have been finalized.

2. The content display system according to claim 1, wherein the main device includes a selection parameter storage unit for storing parameters, and the display unit is configured to simultaneously display the stored parameters at the time of displaying the parameter input window.

3. The content display system according to claim 1, wherein in the main device, the telephone terminal is configured to include a function for accumulating therein the text information sent from the main device and repeatedly displaying the accumulated information, when the parameter number necessary at the time of obtaining the content information from the content delivery server is zero.

4. The content display system according to claim 3, wherein the main device is configured to include a function for performing an acquisition request for the text information to the content delivery server at regular intervals.

5. A content display method of a content display system, the content display system comprising:

a main device provided with at least one telephone terminal including a display unit for displaying a content and being brought under control;

a content delivery server for delivering content information to the main device; and the content information obtained by the content delivery server from the WEB server being displayed on the display unit of the telephone terminal, the content display method, comprising:

the main device storing, as content request information, a location of the content delivery server and a parameter number necessary at the time of obtaining the content information from the content delivery server, wherein the parameter number maybe zero; and in the telephone terminal that requests the content information, wherein the method comprises:

selecting a table of contents;

sequentially inputting a parameter necessary at the time of obtaining information of the selected table of contents;

when all the parameters necessary at the time of obtaining the content information (when the parameter number is zero, there is no input parameter) are input, outputting the content request information in which the selected table of contents recorded in the main device and all the necessary parameters are finalized collectively to the content delivery server;

converting the content information obtained from the WEB server by the content delivery server that has received the content request information, into text information; and displaying the text information on the display unit of the telephone terminal that has requested the content information via the main device.

* * * * *